United States Patent
Palmon et al.

(10) Patent No.: US 9,697,281 B1
(45) Date of Patent: Jul. 4, 2017

(54) AUTOCOMPLETE SEARCH METHODS

(71) Applicant: Fast Simon, Inc., Los Altos, CA (US)

(72) Inventors: Eran Palmon, Palo Alto, CA (US);
Adar Greenshpon, Haifa (IL); Zohar Gilad, Los Altos, CA (US)

(73) Assignee: Fast Simon, Inc., Los Altos, CA (US)

( * ) Notice: Subject to any disclaimer, the term of this patent is extended or adjusted under 35 U.S.C. 154(b) by 274 days.

(21) Appl. No.: 14/191,352

(22) Filed: Feb. 26, 2014

Related U.S. Application Data

(60) Provisional application No. 61/769,418, filed on Feb. 26, 2013, provisional application No. 61/877,205, filed on Sep. 12, 2013.

(51) Int. Cl.
*G06F 17/30* (2006.01)

(52) U.S. Cl.
CPC .............................. *G06F 17/30864* (2013.01)

(58) Field of Classification Search
None
See application file for complete search history.

(56) References Cited

U.S. PATENT DOCUMENTS

| | | | |
|---|---|---|---|
| 7,293,231 B1 | 11/2007 | Gunn et al. | |
| 7,716,579 B2 | 5/2010 | Gunn et al. | |
| 7,921,361 B2 | 4/2011 | Gunn et al. | |
| 8,552,984 B2 | 10/2013 | Knaven | |
| 2006/0080292 A1* | 4/2006 | Alanzi | G06F 17/30864 |
| 2007/0050339 A1* | 3/2007 | Kasperski | G06F 17/30967 |
| 2011/0179357 A1* | 7/2011 | Lin | G06F 17/3089 715/733 |
| 2014/0129540 A1* | 5/2014 | Riley | G06F 17/30 707/709 |

FOREIGN PATENT DOCUMENTS

WO    WO0233527    4/2002

* cited by examiner

*Primary Examiner* — Amresh Singh
(74) *Attorney, Agent, or Firm* — Dov Rosenfeld; Inventek

(57) ABSTRACT

In one embodiment, a server-side process operating on a server includes crawling of one or more websites for possible answers to a query and adding the possible answer entities into a data structure of answer entities to queries. The server-side process also includes serving a requested Web page with an added search box that is displayed by a client coupled to the server. As a user types one or more characters at the client, the client sends the characters, portion-by-portion, e.g., character-by-character to the server-side process. In response, the server-side process searches the index for possible answers to the (so-far-typed) query, and provides to the client a list of answers (rather than queries) to be displayed by the client. Each additional character entered may modify the provided list of answers. The client selecting a listed answer navigation directly to the answer.

30 Claims, 7 Drawing Sheets

FIG. 4

AUTOCOMPLETE SEARCH METHODS

RELATED PATENT APPLICATIONS

This invention claims benefit of priority of U.S. Provisional Patent Application Ser. No. 61/769,418 filed 26 Feb. 2013, and 61/877,205 filed 12 Sep. 2013, both to inventors Palmon et al. The contents each of these U.S. Provisional Patent applications are incorporated herein by reference.

FIELD OF THE INVENTION

The present disclosure relates generally to searching for results on an interconnected network of computers, such as the Internet or an internal internetwork.

BACKGROUND

Search is a critical component for information access when browsing a website on a computing device with a screen, e.g., a computer or a mobile device such as a so-called smart phone, e.g., an iPhone or an Android phone.

This invention dramatically improves information access through search of a website while browsing, especially when searching from a small screen device such as a mobile device.

Accessing information on the Internet, e.g., accessing information on one or more specific websites is done in two ways: top down menu link driven access (referred to herein as "the first method"), and search-based access ("the second method"). In the first method, a traditional top down menu or hypertext provides navigation to another Web page by clicking a hyperlink on a Web page, or by selecting a value from a menu dropdown-box. While the first method provides a structured way of accessing information, it may have drawbacks. Firstly, the first method assumes that a user accessing the information is familiar with the navigation hierarchy and topics therein. For example, it assumes that an user looking for a company's CEO's name, e.g., on the company's own website, would know to look for the "about us" or a similarly named link on the home Web page, and then "management" or a similar link, and then looking for the actual paragraph on the Web page. Additionally, the first method may limit the amount of information that is easily accessible, in that the ease of access goes down as the number of hyperlink clicks and scroll-downs required for the access increases. For example, finding a single lawyer's name on a law-firm website that has 180 lawyers, might require going through a list of 180 links in the "our team" or equivalent Web page, and quite a bit of scrolling—especially on a small screen device. The second method, i.e., searching enables a user to access information by entering (e.g., typing) a query of one or more words, or a phrase in a natural language in a search box. Search technologies make use of natural language processing algorithms and indexing of Web pages to find answers that could be a possible match to what the user entered.

Some of the more advanced search methods include an autocomplete functionality to accelerate entering a query. Once the user enters just a few characters in a search box, an autocomplete method immediately offers contextual and relevant query suggestions. The emphasis here is on the suggestion of one or more queries to the user. The object of autocomplete technology is to predict the user's query intent by considering the few keystrokes (characters) that have been entered. As more keystrokes are entered, the suggested queries may change.

Typical existing search methods that include an autocomplete method may be described by the following user process flow (hereinafter "Typical Existing Process"):
  1. A user starts typing a query in a search box on a website.
  2. While typing, the user may be offered a list, e.g., as a dropdown list of possible queries.
  3. The user either selects one of the suggested queries, or fully enters the query in the box.
  4. Search engine displays a results Web page.
     a. Each answer in the result Web page may include a few lines or a short paragraph, to allow users determine possible match to query.
     b. Each answer is a link to a Web page.
  5. The user scans every result-paragraph on Web page to match for search intent.
  6. The user scrolls through the list, often going through screens, until finding what appears to be a reasonable answer.
  7. The user then clicks on the result Web page's link and navigates to the result Web page.
  8. The user reads through the result Web page, and looks for the answer she was looking for throughout the Web page.

BRIEF DESCRIPTION OF THE DRAWINGS

FIG. 4 shows an example result Web page displayed to the user after the user selects the "Child Support" result of FIG. 3 to according to an embodiment of the invention.

DESCRIPTION OF EXAMPLE EMBODIMENTS

Figure 1:
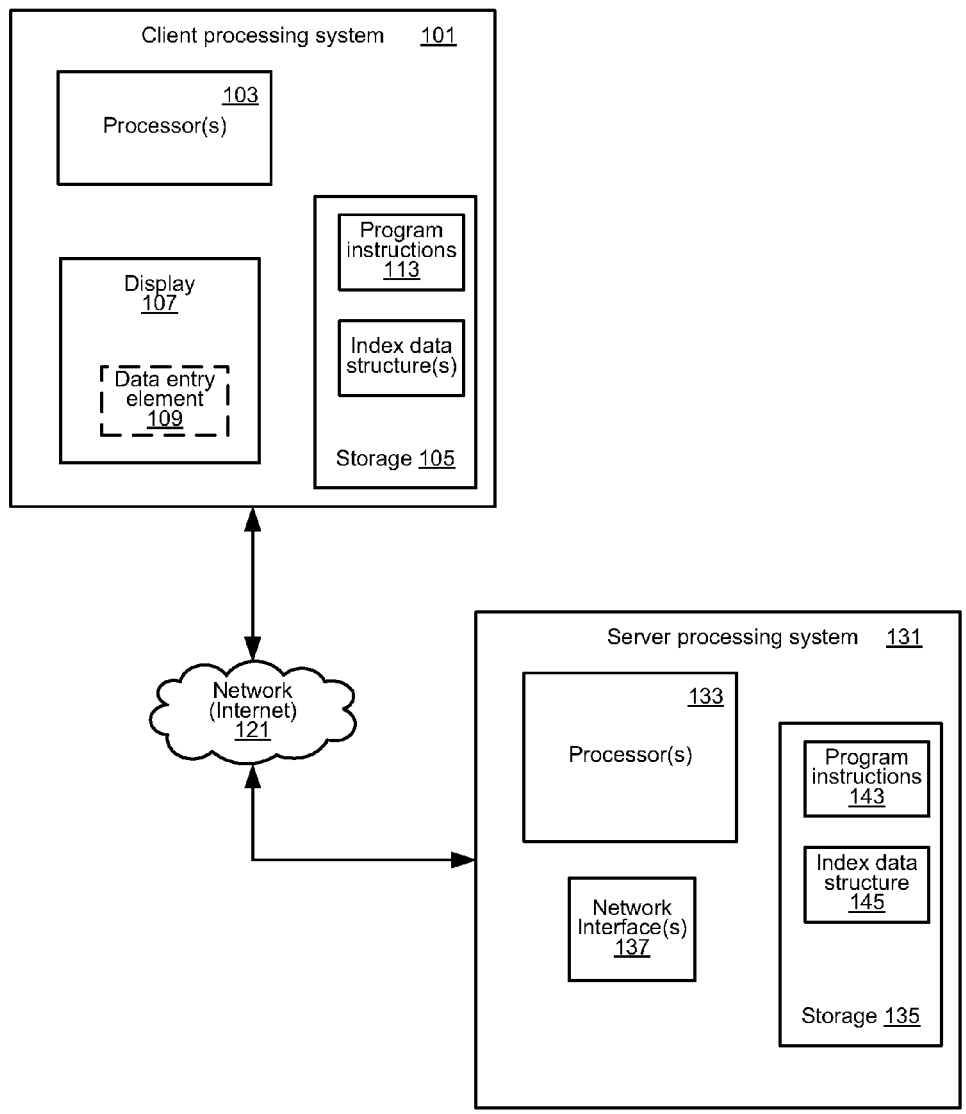
FIG. 1 shows a simplified block diagram of an example client server system on which some embodiments of the invention operate and which include embodiments of the present invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be used without departing from the principles described herein.

Overview

Embodiment of the invention include a method of operating one or more processors to carry out searching according to a query, a non-transitory computer-readable medium comprising instructions that when processed by one or more processors, carry out a method of searching according to a query, and a processing system configured to carry out a method of searching. Embodiments of the invention include a client-side process comprising elements that operate on a client processing system such as a mobile "smart phone" or a tablet, or some other client device that is coupled, e.g., via a network, e.g., the Internet, to a server processing system that includes one or more server processors, and storage coupled to the processors.

Embodiments of the present invention may significantly improve the search process of existing processes such as the above-described Typical Existing Process, possibly resulting in improvement of one or more of speed, ease of use, and more intuitiveness of the process. One example of a workflow that an embodiment of a server-side process operating on a server processing system and a client-side process interacting with a user and operating on a client processing system is described in the following paragraph. The server processing system includes one or more processors, storage containing the software for the server-side process, networking elements, and other elements known in the art, while the client-side processing system includes one or more processors, storage containing the software for the client-side process, a display device, a character input mechanism such as a real or virtual keyboard or keypad, networking elements, and so forth. Examples of a client processing system include a terminal, a personal computer, a smartphone, a tablet device, and so on. The client processing system is coupled to the server processing system, e.g., via a special-purpose link, a private network, or an internetwork, e.g., a public network such as the Internet or a cellular network, possibly combined with the Internet.

In one embodiment, the server-side process includes elements that operate on the server processing system and that carry out crawling of one or more websites for possible answers to a query and adding the possible answer entities into a data structure of answer entities to queries. In one embodiment the server-side process indexes the possible answers into an index data structure, which is the data structure of answer entities to queries. The server-side process also includes elements that when executing on the server processing system serve a requested Web page with an added search user interface element.

1. As a result of the server serving a Web page of a website, according to an aspect of the present invention, the served Web page includes a search user interface element, e.g., a search box for carrying out a search via the website, and the client processing system displays the page including the search box.

2 A user at the client processing system starts typing a query in the search box, and as the user types one or more characters, the client-side process accepts, one by one, the characters from the user and sends them to the server-side process.

2. Responsive to a client-side-entered keystrokes sent to the server, the server-side process searches the index for possible answers to the (so-far-typed) query, and provides a list of answers to be displayed by the client-side process, e.g., displayed in a dropdown list window on the client processing system, such that while the user is typing, the search system or process offers the user a search result list, e.g., a dropdown list of answers. Each additional character entered narrows the search such that each additional character may modify the search results list. Note that the list is of answers rather than of queries as in the Typical Existing Process.

In one embodiment:
  a. Each answer is a single line (alternately, a small number of lines), rather than a paragraph, making it suitable for a client processing system that has a small screen.
  b. Each answer is in provided in a context of a well-defined section of the website, allowing the user to make quick judgment of its relevance. For example, if the website is structured as a tree of Web pages, the context may be the parent of a particular page.
  c. Each answer may link to a specific portion of the Web page rather than to the whole Web page, in order to add precision.

3. The user provides the client-side process with a selection from the list of answers in order to cause navigating directly to the relevant portion of the Web page. The client process accepts and sends the selection to the server-side process. In response, the server-side process serves at least a portion of a selected Web page corresponding to the selected answer to the client-side process for display to the user.

This may significantly improves searching by one or more of:

Eliminating key steps in the existing search process flow such as the Typical Existing Process by using automation.

Reducing the screen area ("screen real-estate") needed for display in the search process, such that the client processing system can have a relatively small display.

Accelerating the existing search process such as the Typical Existing Process using a combination of a novel pre-process indexing process, and a "smart" display process.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

FIG. 1 shows one embodiment of an environment on which embodiments of the invention operate. Such embodiments include aspects of operating a client device, also called a client processing system 101 that includes one or more client processors 103, client storage 105 including a memory, a display 107 coupled to at least one client processor, a network interface to couple the client device 101 to a network 140, and a data entry mechanism 109 that includes a character input mechanism, which may take the form of a physical key pad, physical keyboard, a virtual keyboard in the form touch sensitive display of a keyboard, or some other mechanism for a user to enter characters. The data entry mechanism 109 further includes a selection mechanism for the user to enter a user selection at a particular location on the screen. Examples of selection mechanisms include a physical pointing device such as a mouse, touchpad, pen, or trackball to point to the location on the display, with a button to click. Examples also include a touch sensitive display. Examples of a client device include a "smart phone," a tablet, a laptop computer, a desktop computer, or some other client device. The client device includes software (program instructions) 113 that when executed on one or more of the processors 103, cause the client processing system 101 to carry out a client-side process that includes aspects of the present invention. The client-side process in some versions includes elements that operate on a browser process, which in some versions may be part of the operating system software. Aspects of the invention operate upon a user interacting with a Web page displayed on display 107 by a browser operating on the client 101. The client processing system 101 further includes a mechanism to accept a user selection, e.g., by the user clicking on a location displayed on the display 107, e.g., by using a pointing device such as a mouse, a touchpad, pen, or trackball to point to the location on the display, or by touching the display 107 in embodiments in which the display 107 includes a touch sensitive surface. Note, as is known in the art, the data entry mechanism 109 may include a voice entry mechanism.

The client processing system 101 is coupled directly or via a network 121 to a server processing system 131 that includes one or more server processors 133, and storage 135 coupled to the one or more server processor 133, the storage including memory and one or more other storage elements. The storage element 135 include instructions 143 that when executed by at least one processor 133, cause the server processing system 131 to carry out a server-side process. The server processing system is coupled to or comprising a source of websites. The coupling is in one embodiment is the Internet, and in an alternate embodiment, is an Intranet coupled to servers storing websites.

In much of the description, per FIG. 1, the coupling between the client system 101 and server system 131 is a network 121, e.g., a private network or a public network such as the Internet, a cellular data communication system, or a combination of the Internet and a cellular data communication system. In the description, unless otherwise stated, the network 121 is the Internet. The invention, however, is not so limited, and in alternate embodiments, the link between the client system 101 and server system 131 is a private network, or a direct link.

Note that the server processing system 131 may be a distributed system that includes several servers coupled by the same network 121 or another network, and may include elements that are replicated at several locations. Furthermore, as would be clear to those skilled in the art, there may be a distinct server system for maintaining the autocomplete aspects of the present invention, i.e., the server-side process, and another for serving Web pages of websites. All such servers are, for simplicity of explanation, shown as the single server processing system 131.

The Server-Side and Client-Side Processes

Figure 2:
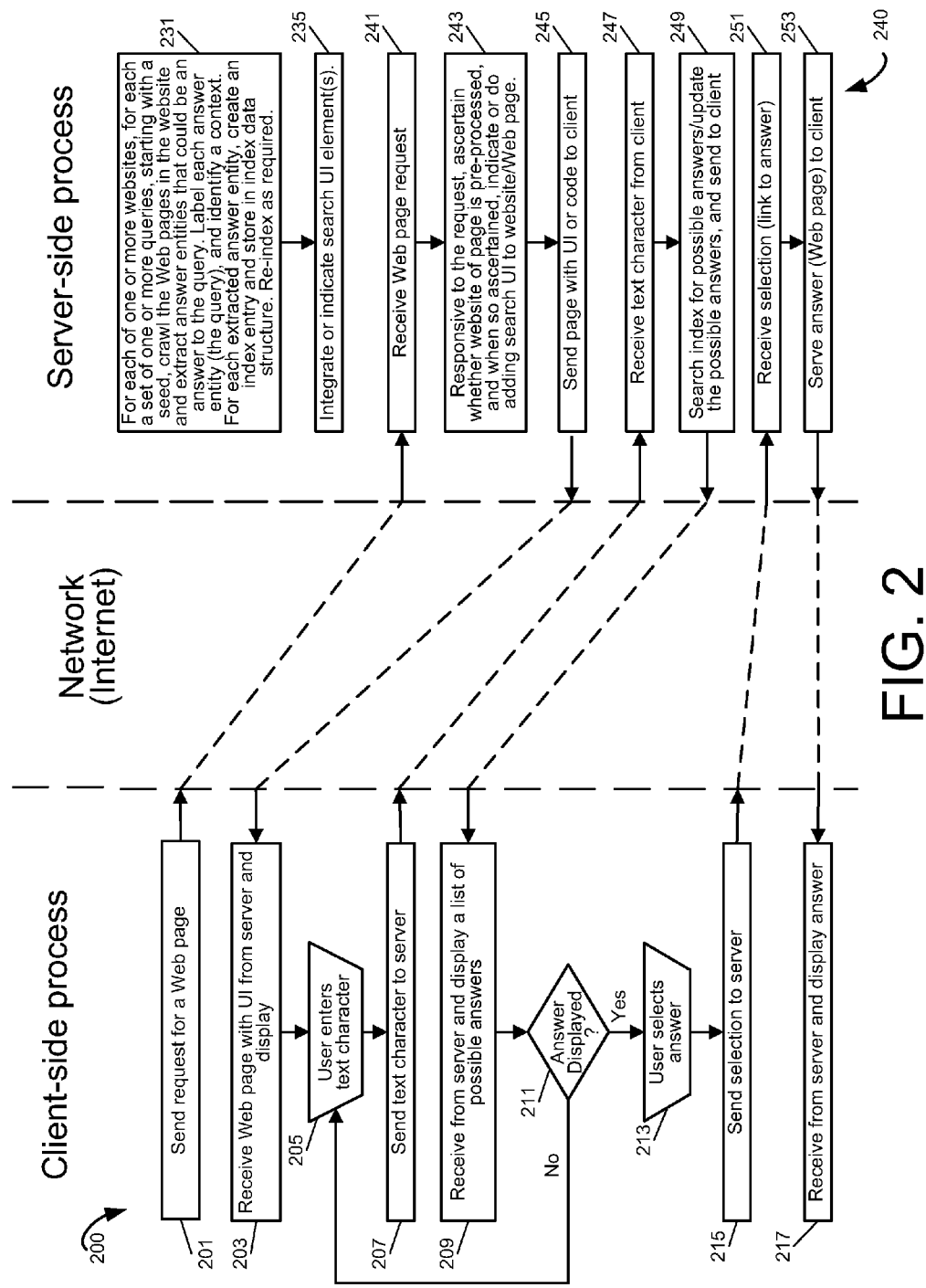
FIG. 2 shows a simplified flowchart of a client-side process and a server-side process linked by a network, according to an embodiment of the invention.

FIG. 2 shows a simplified flowchart of a client-side process 200 and a server-side process 240 linked by the network 121, according to an embodiment of the invention. The server-side process 240 carried out on the server processing system 131 includes pre-processing one or more websites to extract possible answer entities in a website and to index each possible answer entity. Pre-processing comprises, in 231, for each of one or more websites that comprises one or more Web pages, starting with a particular Web page called the seed, and for each query of a set of one or more queries, crawling the Web pages of the website and extracting answer entities that could be an answers to the query. Each answer entity is a Web page or a part thereof, e.g., for example a subsection, a paragraph, an image, or some other portion of a Web page, which could be considered an answer to the query. Step 231 includes labeling each answer entity with a label that includes the query or an identifying function thereof usable to search for the entry. In some embodiments, the label includes an indication of the website. An answer entity may have a context, by which is meant a parent answer entity, such as the title of the parent page, or some other property, and step 231 includes identifying the context, if any. For each extracted answer entity, 231 includes creating an entry for an index, and storing the entry in an index data structure 145 (also referred to as the index) maintained in the storage 135 of the server processing system 131. Each index entry also is given a rank. Step 233 includes integrating at least one search user interface (UI) element ("search UI") such as at least one search box into the website, through the addition of code, e.g., JavaScript code that when executed, cause the search box to be part of a Web page of the website when displayed using a client browser on the display 107 of the client processing system 101. In some versions, the search UI code or pointer thereto is added to the index entry in index 145 so that the code can be added when serving a pre-processed page, while in another embodiment; the process includes integrating the search UI(s) directly into the page(s).

The client-side process 200 carried out on the client processing system 101 typically includes elements that operate on a browser process, which in some versions may be part of the operating system software of the client processing system 101. The client-side process 200 includes in 201 sending a request for a Web page of a website to the server processing system 131.

In 241, the server-side process receives the client request for the Web page, and in 243, responsive to the request, ascertains whether the website of the Web page has been pre-processed, and upon ascertaining that the website has been pre-processed, adds the search UI(s) step 233 to the requested page. In some versions the search UI(s) are added to the website as part of step 233. In 245, the process 240 sends the requested Web page with the search UI to the client-side process 200.

The client-side process in 203 receives the Web page (with the search UI or indication) and displays the Web page with the search UI.

Figure 3:
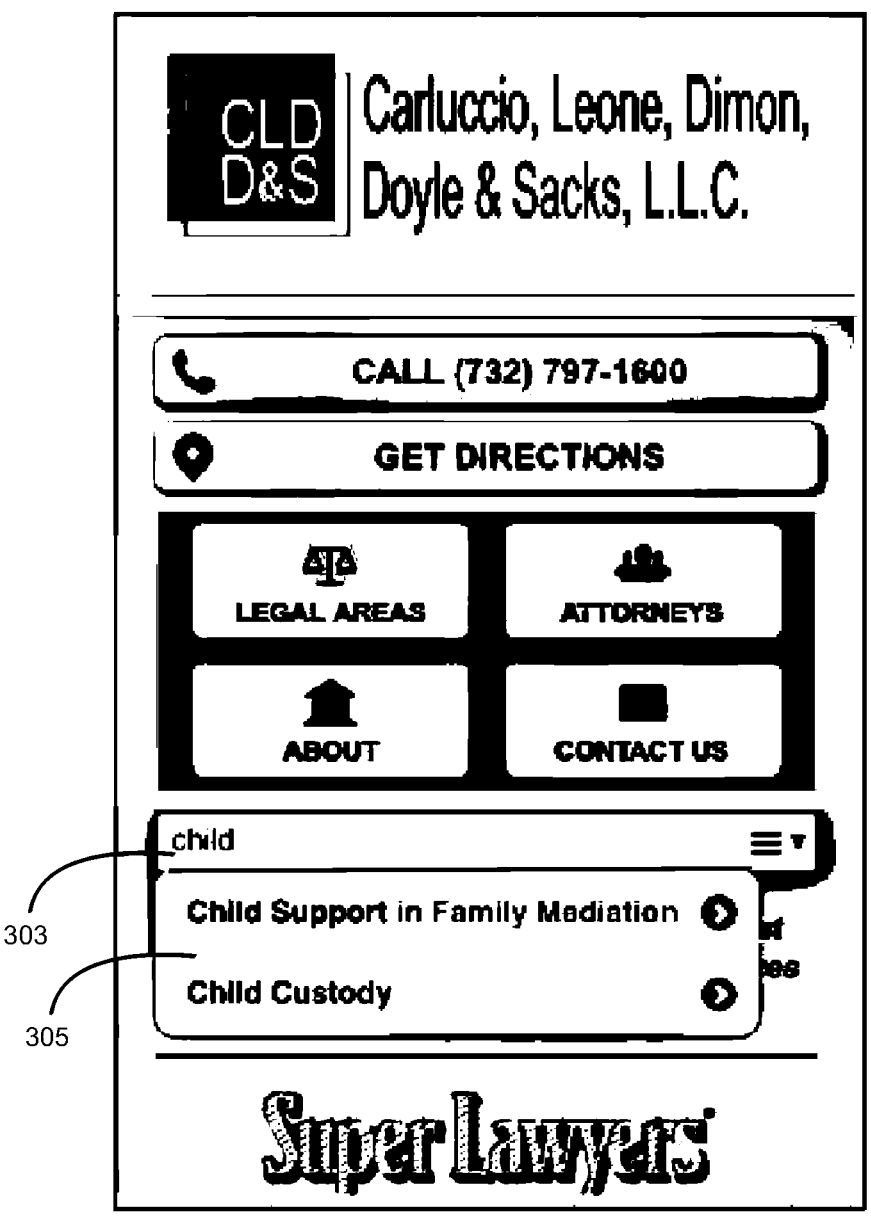
FIG. 3 shows an example dropdown result list that is automatically created and displayed to a user according to an embodiment of the invention.

FIG. 3 shows an illustrative example of such a Web page 301 of an example website that was requested from the server-side process 240, and which, in original form did not have the search box shown as search UI 303, but in the drawing is shown after modification to add the search UI 303 according to an aspect of the invention. In 205, the user enters characters of a query in the search box 303, e.g., characters of the word "child" in the search box 303. In 207, the client-side process 200 sends the characters on-the-fly to the server processing system 131 as the user enters the characters. By on the fly is meant on-the-fly portion-by-portion, i.e., one or more characters at a time, e.g., one by one, or two-by-two, etc. In the embodiment described herein, one-by-one is assumed. In 247, the server-side process 240 receives the text character (or next portion) from the client-side process. At any time during the process, the server-side process has received a so-far-sent initial part of the query, which over time gets longer and longer until the initial part is the whole query. In 249, responsive to the receiving the character and having the initial part, the server-side process 240 searches (looks up) the index data structure 145 stored in the server storage 135 as a result of the pre-processing step 231 for possible answers that match the initial part of the query, e.g., according to the rank in the corresponding index entry, and sends the most probable answer entities answers to the client. Step 247 includes updating the possible answers on-the-fly as each additional character of a query is received, so that the initial part includes more of the query than the previous initial part. In 209, the client-side process 200 receives the answers via the network 121 and displays the possible answers, e.g., as a list of possible answers. In one version, step 209 causes a dropdown box 305 with the suggested answers that are being created on-the-fly, to be displayed. As the user continues typing the query, the dropdown box of the list of answers will change as the list of probable answers changes. By the time the complete query, i.e., the word "child" is entered by the user, as shown, two unique results to the user's partial query are provided to the client processing system 101 and displayed in dropdown box 305. Each result links to a Web page or part thereof: "Child Custody" and "Child Support" in 'Family Mediation,'" respectively. The 'Family Mediation' element in the "Child Support" answer is the "context" that an embodiment of the pre-processing process of the server-side process has pre-processed and indexed for the answer "Child Support" in the index 145 stored in storage 135 of the server processing system 131. One example of context is the parent Web page of the Web page in the website, or the link on a parent page that causes navigation to the result. In 211 the user ascertains if a desired answer has been displayed. If not, the user continues in 205 entering text characters. If the desired answer is displayed, in 213 the user selects the desired answer, and in 215, the user selection is accepted and sent to the server-side process 240. In 251, the server-side process receives the user selection, e.g., in the form of a link to the answer or to the index entry, and in 253, the server-side process serves the answer, e.g., as a Web page or part thereof, to the user. In 217, the client-side process 200 receives the served answer and displays it on the display 107 of the client processing system 101. In one version, when the answer entity is part of a Web page, in 217, the client-side process, e.g., operating on a browser component, navigates to the correct answer entity on the website, scrolls down automatically to the relevant portion on the Web page and highlights it.

In some embodiments, an updating engine (an "updater") that carries out an updating process operating, in one embodiment as part of the server-side process 240 on the server processing system 131, accumulates users' search patterns and/or behaviors, and from time to time, e.g., at predefined times or every predefined time period, or upon the accumulated search patterns reaching a pre-defined criterion, e.g., the number reaching a pre-defined threshold, updates ranking of searches and updates the indexing of possible answers. When the updating is from time to time, the updating can be every few minutes, every few hours, every few days, or once a month, depending on the application, and the needs for the index to be up-to-date for the websites included in the index data structure. For example, suppose the index data structure 145 is for information of firms of a particular type, e.g., of law firms, and includes a website of an office, e.g., the law firm of the examples of FIGS. 3 and 4, updating need only occur as often as there are changes on law firms, or there are sufficient accumulates searches. For example, referring to FIG. 3, if in the indexing pre-process phase the term "Child Support" had not been indexed, and at some stage, e.g., after a month, the updater determines that "Child Support" or similar is a term that users are searching for, as indicated by the number of times the term is searched for in a pre-defined period, e.g., a month, reaching a pre-defined threshold, e.g., 12, the server-side process re-indexes one or more websites for the term "Child Support", thus improving the likelihood of finding this term going forward. In some versions, the updater also uses accumulated search data to update rankings, thereby accelerating the search process. For example, if it turns out that the term "Child Custody" is much more popular than "Child Support", the updater increases the ranking of "Child Custody" which effectively results in displaying "Child Custody" before "Child Support" to the user, thereby accelerating the search process.

Figure 4:
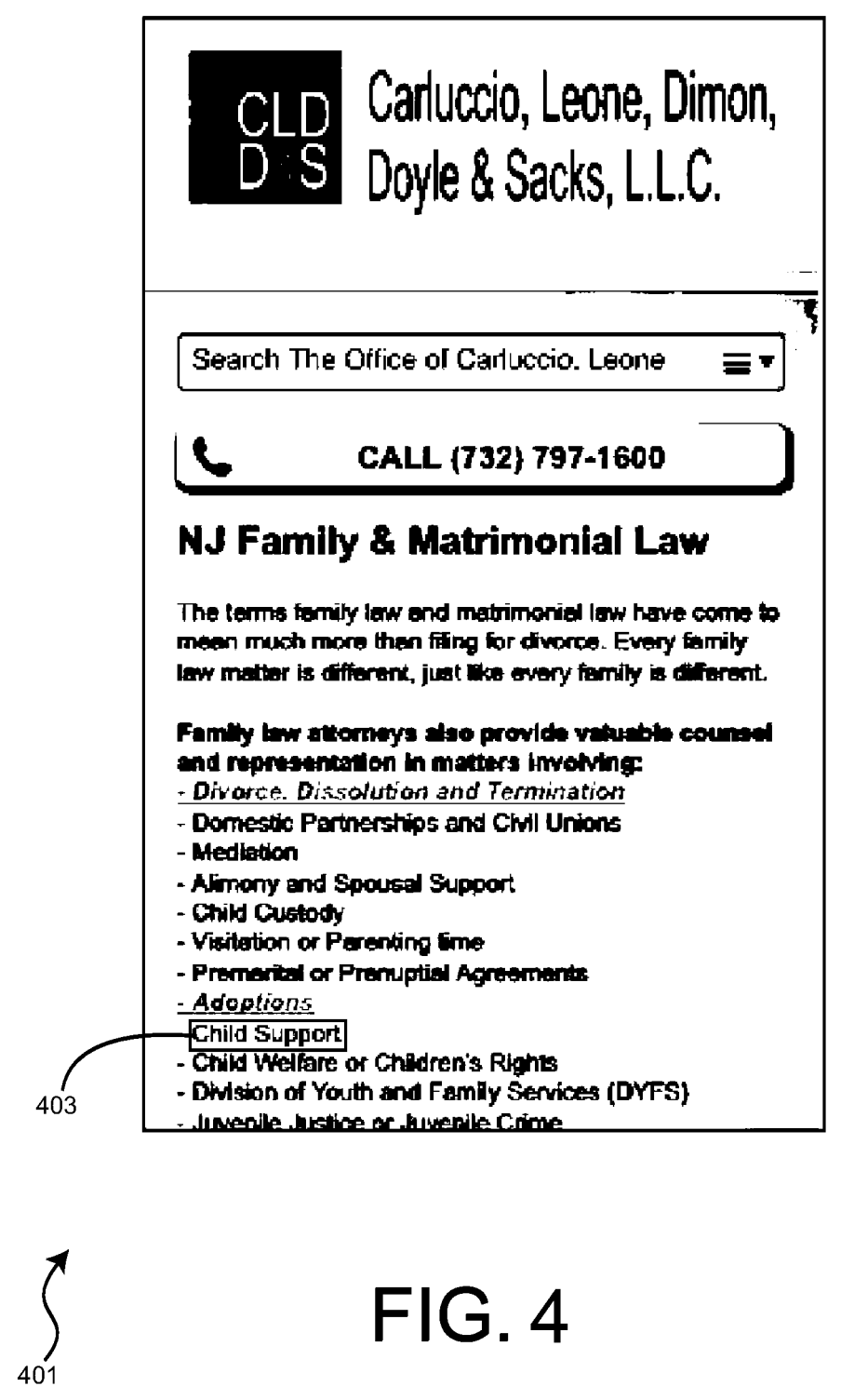

FIG. 4 shows the actual result Web page 401 displayed to the user after the user in 213 selects the "Child Support" result of FIG. 3. When the user clicks on the result in the drop down box, step 214 in the client processing system 101 sends the URL of the answer to the server processing system 131. The server processing system 131 receives (251) and responds (253) with the Web page. The client processing system 101 thus automatically navigates to the result Web page. Furthermore, the code in the search UI also causes the display to scroll to the actual paragraph, or Web page portion where the result "Child Support" appears, and highlights the result, e.g., as box 403. Note the result is in a page that includes "Family" in the title and "mediation" as an element.

Pre-Processing: Extracting Possible Answer Entities in a Website & Indexing

The server-side processing step 231 that searches for and indexes answers of one of more web-sites, is now described in in more detail. This step forms part of pre-processing, and also of updating (see below). Note that while in the example embodiment, the pre-processing is carried out in the server processing system 131, so is considered part of the server-side process, in an alternate set of embodiments, part or all of the pre-processing is carried out by other processing systems, e.g., even in the client processing system 101. The resulting index data structure 145, however, is maintained in the server processing system.

Pre-processing one or more websites includes extract possible answer entities in a website and to index each possible answer entity. An answer entity is a Web page or a part thereof. For example, referring to the example law firm website, Web pages of which are shown in FIGS. 3 and 4, a Web page about "Child Custody" is an answer to the query "custody". An image of a map in an "about us" Web page (not shown) is an answer to the query "address" and a biographical paragraph about a particular person, e.g., John Smith (not shown) is an answer to the query "CEO" and also to the query "John". In this context, an extracted possible answer is an answer entity, having a label that describes the answer entity. An answer entity can be a whole Web page (e.g., a "Family Law" Web page in a law-firm's website), a section in a Web page (e.g., a "Child Custody" section in the "Family Law" Web page in the law-firm's website of FIGS. 3 and 4), or a specific term in a Web page (the term "recommending mediation" in the "Child Custody" section in the "Family Law" Web page in the law-firm's website)). Answer entities could be nested. As an example, a section in a Web page is part of a Web page, e.g., of a subset of a Web page.

On one embodiment, step 231 uses one or more heuristics to extract a potential answer entity and determine whether a potential answer entity is an answer entity. Elements having one or more properties in a website can be defined as answer entities. In one example, without limitation, a potential answer entity is any of:

A whole Web page or a section of a Web page.
A proper noun or noun phrase, i.e., a capitalized term.
A caption to an image.

Each potential answer entity has a rank according to its likelihood as a potential answer to a hypothetical query of a user. For example, referring again to FIGS. 3 and 4, a whole Web page about "Family Law" is ranked higher as an answer then mentioning Family Law in a practice area of an entry on a particular lawyer in a Web page. In one embodiment, one element contributing to the likelihood used for rank is the hierarchical outline position of the query in the Web page. For example, a query that appears in the title of the Web page may be given a rank of 0.9, a query that appears in the title of a subsection of the Web page may be given a rank of 0.7, and in the case the query appears only in other part(s) of the text in a Web page, it is given a rank of 0.5. Assigning a rank is part of the heuristics that extracts an answer entity.

Referring again to FIG. 2, process step 231 of the server-side process 240 includes adding to the index data structure 145 an index entry for each extracted answer entity. The index data structure 145 will be assumed to be an index table, with each entry for an answer including the label, the answer entity location (Web page and position), and the context (parent answer entity). The invention, of course, is not limited to using a table as the index data structure 145.

In addition, one embodiment includes a dictionary of answer entity synonyms (e.g., "tel" is synonymous with "phone"), to match a-user's likely intent, even if the website has not used the exact term. Including a provision for synonyms is common in searching, and one skilled in the art would know how to integrate such a provision in embodiments of the present invention.

Updating Indexes and Rankings of Possible Answer Entities

As summarized above, some embodiments of the invention includes an updater engine carrying out an updating process operative to post-processes one or more websites, operating, for example, as part of the server-side process 240 on the server processing system 131. Note that in alternate embodiments, part or all of the updater process is carried out on a different processing system, even the on the client processing system 101. The post-processing of the one or more websites includes, from time to time, essentially carrying out step 231 again to extract additional possible answer entities in the website(s), to index the results, and, in some versions, change the ranking of existing answer entities of the index data structure 145 according to users' search patterns accumulated by the updater. Of course, as websites change, the post-processing may delete one or more possible answer entities from the index data structure 145.

One embodiment of the updating process for one or more particular websites includes, in addition to extracting and indexing additional possible answer entities for existing search terms, includes an accumulating step that accumulates new search terms actually used by users on the one or more particular websites, but that have not been indexed. In one embodiment, the updating process from time to time, e.g., periodically every pre-defined time interval, in 231, crawls the Web pages of the one or more particular websites and extracts answer entities that could be an answer to the new search terms. Step 231 comprises ensuring that index entries are included in the index structure 145 for respective answer entities. For example, referring to the example law firm website that includes the Web pages shown in FIGS. 3 and 4, if "Child Custody" had not been indexed, and the accumulating step of the updater determines that one or more users have "custody" as a query, the server-side updating process includes re-crawling the website, looking for specific answers to the query "custody." This eventually produces "Child Custody" as a new answer entity, and a new index entry for this query and answer entity for the website is created in the index data structure 145.

In some versions, the updater engine uses the accumulated users' search patterns, to re-rank the indexed answers in the index 145. This may change the ranking of an indexed answer, possibly increasing its ranking over other possible indexed answer entity answers.

The re-crawling of step 231 is essentially the same as the website crawling of step 231 during pre-processing, and uses one or more heuristics to incrementally extract and determine answer entities, including whether an element has one or more properties that indicate an answer entities. As in the pre-processing, in one example embodiment, answer entities include but are not limited to a whole Web page or section thereof, a proper noun or term, and a caption to an image. Each answer entity has a rank according to its likelihood as a potential answer to a hypothetical query of a user. Assigning a rank is part of the heuristics that extracts an answer entity. One embodiment includes from time to time changing the rank of an answer entity based on users search patterns both in terms of the query the use and answers they choose.

An Embodiment in More Detail

Figure 5:
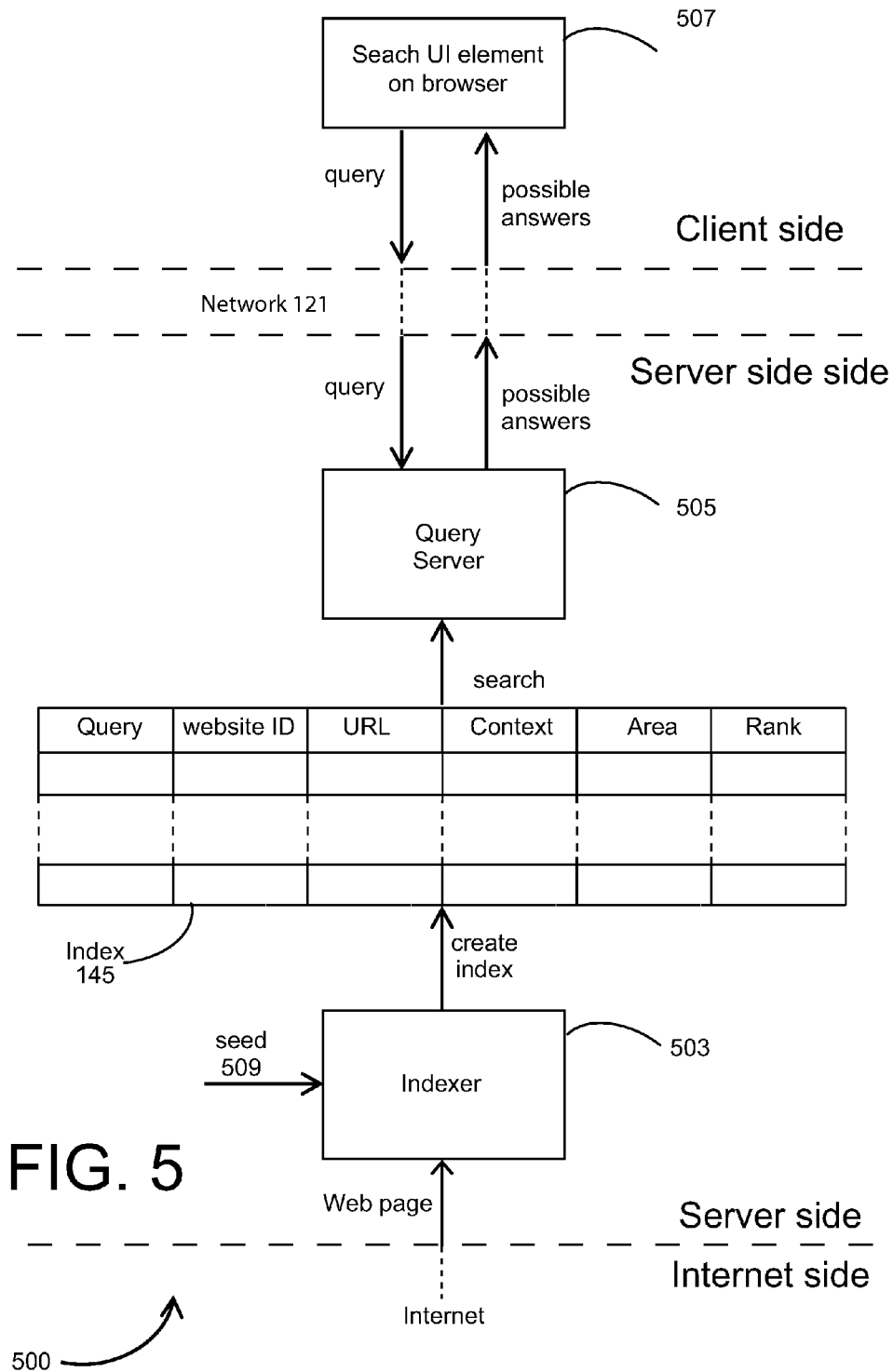
FIG. 5 shows elements that are included in one embodiment of the invention.

FIG. 5 shows some of the elements 500 that are included in one embodiment of the invention.

The embodiment comprises the index data structure 145 that in one embodiment is maintained in storage 135 of the server processing system 131. In one embodiment, the index data structure 145 is in the form of a table of entries, where each entry (or record) contains a possible answer to a query. In one embodiment, each entry of the index data structure 145 includes the following fields:

(a) Query: the full query the user can type (e.g., "child custody"). This also is called the label of the query;

(b) URL: the URL where the answer to this query exists, e.g., www~dot~mysite~dot~com/familylaw~dot~html, where "~dot~" denotes the period character "." in the URL;

(c) Context: the context of this query, if such context exists, the context including the parent answer entity (for example "Family law" for the examples of FIGS. 3 and 4);

(d) Area: the area in the Web page where this answer is found (for example the component html ID); and (e) RANK: the rank, i.e., the relative rank of the importance of the term.

In one embodiment, because It is possible that for a given query, multiple websites may have answers to that query, an additional field, denoted website ID is includes in each index entry, and is an identifier that uniquely identifies the website.

One embodiment comprises an indexer engine 503, operative as part of the server-side process 233 on the server processing system 131 to carry out a process that receives a URL 509 of a website, which, in one embodiment, is the home Web page URL of the website, also called the "seed" of the website, and creates records for this website in the index data structure 145. The Indexer 503 is described in more detail below with reference to FIG. 6.

A query server engine 505 is, in one version, part of the server-side process 240 FIG. 2 that is operative, in steps 247, 249, 251, and 253, to receive a first part of a user query from the client-side process 120, e.g., from a browser application operating on the client processing system 101, e.g., on the user's mobile device. While in the embodiment discussed herein, the query server engine 505 operates only on the server processing system 131 which is coupled, e.g., via the network 121, to the client-side process 200, in alternate embodiments, part or all of the query server 505 may operate on the client processing system 101.

The query server 505 is operative to carry out steps 247, 249, 251, and 253, including in 249 sifting through the entries of the index data structure 145 and finding entries having a Query field that matches the so-far entered user query. A match could be a simple match the indicates that the so-far entered user query is exactly the same as a first part of a matching Query field of the entry. In one embodiment, a match also may be an advanced match that indicated that the user query first part is similar to but not exactly the same as the first part of the Query field of the entry. One version such an advanced match allows one or more character of a user's typed first part to not need to be an exact match to the corresponding first part of an entry's Query field. This permits spelling errors. One embodiment further matches a user's (first part of a) query to (a first part of) any word—not necessarily the first word—in an entry's Query field.

Some embodiments of the user query will create further indices 145 to make this operation faster. The query server will collect all possible answer entries and return the most probable. In some embodiments it will be sorted by rank. In another embodiment it will be a multiplication of the match factor (for example, 0.9 multiplied by the number of different characters) and the rank.

Step 233 of the server-side process inserts a search UI 507, shown as search box 303 in the particular example Web page of FIG. 3, comprising code, to the website Web page that the user sees. search UI 507 is operative on the client processing system 101 to displays a search UI, e.g., search box 303 on the user's device based on information received from the server processing system 131. For each keystroke of the user, the code in search UI 507 is operative to submit a query for the server processing system 131 and to receive probable answers. In one embodiment, browser element 507 displays those answers in a pull-down menu, and responsive to the user's selecting one of the displayed answers, element 507 is operative to send the URL to the server, and then to navigate to the correct Web page of the answer, and in one embodiment, to add one or more parameters indicative of the position of the answer, e.g., by highlighting at least some of the answer. The browser element of the loaded Web page will continue the navigation and scroll to the position of the answer in the Web page.

Figure 6:
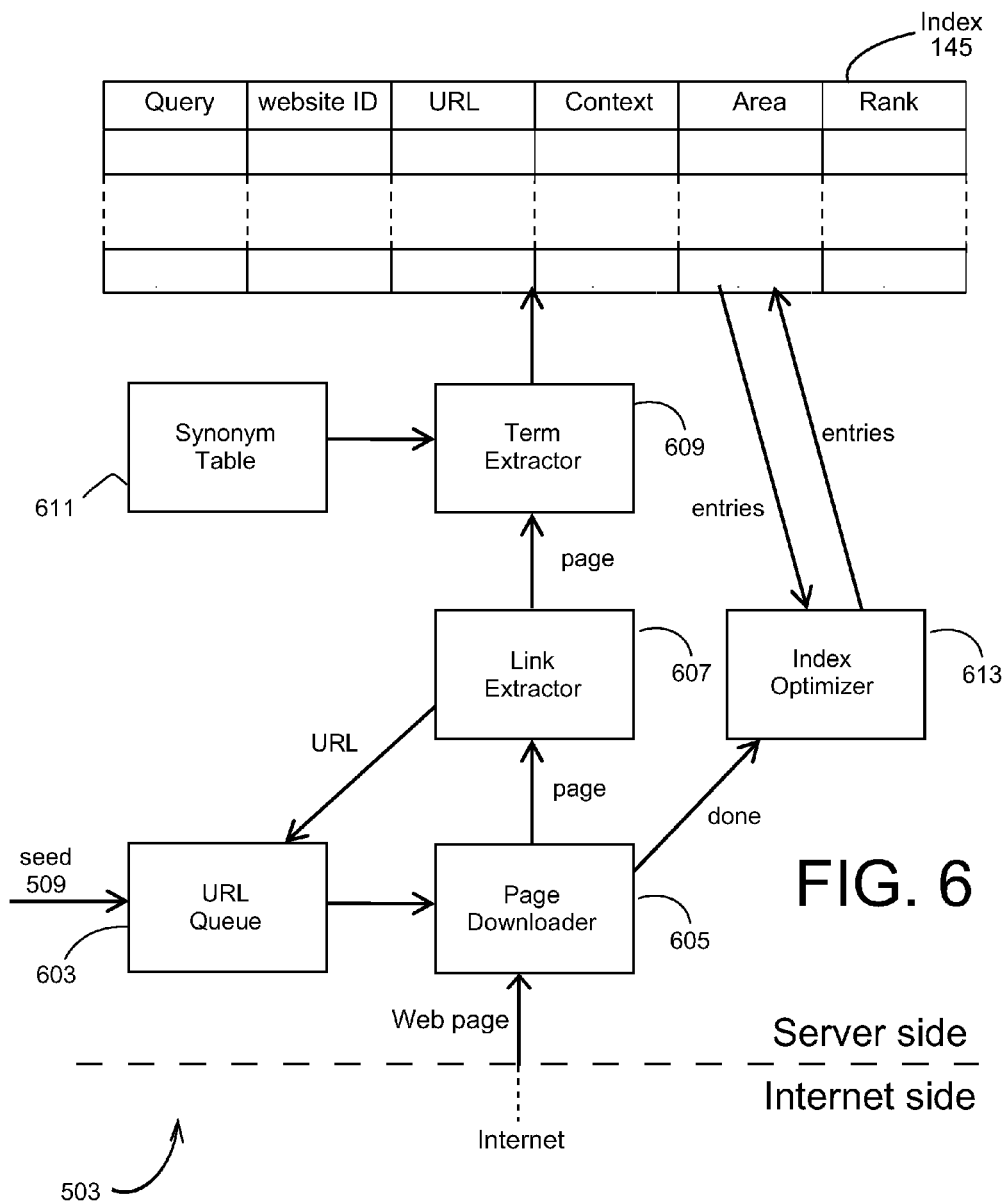
FIG. 6 shows a process carried out by an indexer according to an embodiment of the invention.

FIG. 6 shows the process 233 carried out by the indexer engine 503 in more detail. In one embodiment, the indexer 503 operates on a server processing system 131 that is coupled, via the network 121, to the user's device and to the Internet. However, in some embodiments, the indexer 503 can also, or instead, operate on the user's device. In some such embodiments, the indexer 503 can run on the user's device in the background to build and update the index data structure 145.

The process 233 of indexer 503 starts by receiving a seed URL 509 that initialized a URL Queue 603, which is a queue (or other suitable data structure) of URLs to be processed. A Web page downloader 605 is operative to pop a URL from the URL queue 603, to retrieve the Web page from the website (via the Internet), and to send the retrieved Web page to a link extractor 607. The link extractor 607 is operative to scan Web page(s) for external links. If the links are on the target website, i.e., have the same location as the seed, the link extractor 607 adds it to the URL queue 603. In one embodiment, the URL queue 603 also includes a list (or other data structure) of URLs (or other indicators) of "already crawled" pages, so that a particular URL that was already pushed to the URL queue 603 will not be pushed again.

After being processed by the link extractor 607, a term extractor 609 is operative is to analyze the Web page by scanning the Web page for possible answer entities. In some embodiments, term extractor 609 searches for header text and/or for capitalized terms, and/or for terms having one of a set of pre-defined structures, such as numbers or an address. The term extractor 609 also is operative to analyze the context of a term. In some embodiments the context includes header text of the Web page wherein the term is found, or some other parent answer entity. The term extractor 609 also is also is operative to put in the index the position of the answer in the Web page. In some embodiments this is an HTML identifier (ID) of ID of the HTML source of the answer. Some embodiments include a synonym table 611 (or other mechanism and data structure to come up with synonyms of a term). The term extractor 609 is in such an embodiment is also operative to use the synonym table 611, and, in the case an answer entity is found and matched in the synonym table 611 to put into the index any available synonym(s).

The analysis of the Web page by term extractor 609 also includes determining a rank for an answer which is indicative of the likelihood the answer is correct for the user query. In one embodiment, the rank determination is according to rank is the position of the query in the Web page. In one embodiment, a query that appears in the title of the Web page may be given a rank of 0.9, a query that appears in the title of a subsection of the Web page may be given a rank of 0.7, and in the case the query appears only in other part(s) of the text in a Web page, it is given a rank of 0.5

The Web page downloader 605 continues to operate until the URL queue 603 is empty. In some embodiments, an index optimizer 613 is configured to start operating when queue 603 us empty to go over the each of the answer entities and carry out one or more optimizations. For example, in one version, if an answer entity appears in more than three Web pages then it is considered to be less distinctive and is removed from the index data structure 145.

Providing for Action Upon Certain Events

Figure 7:
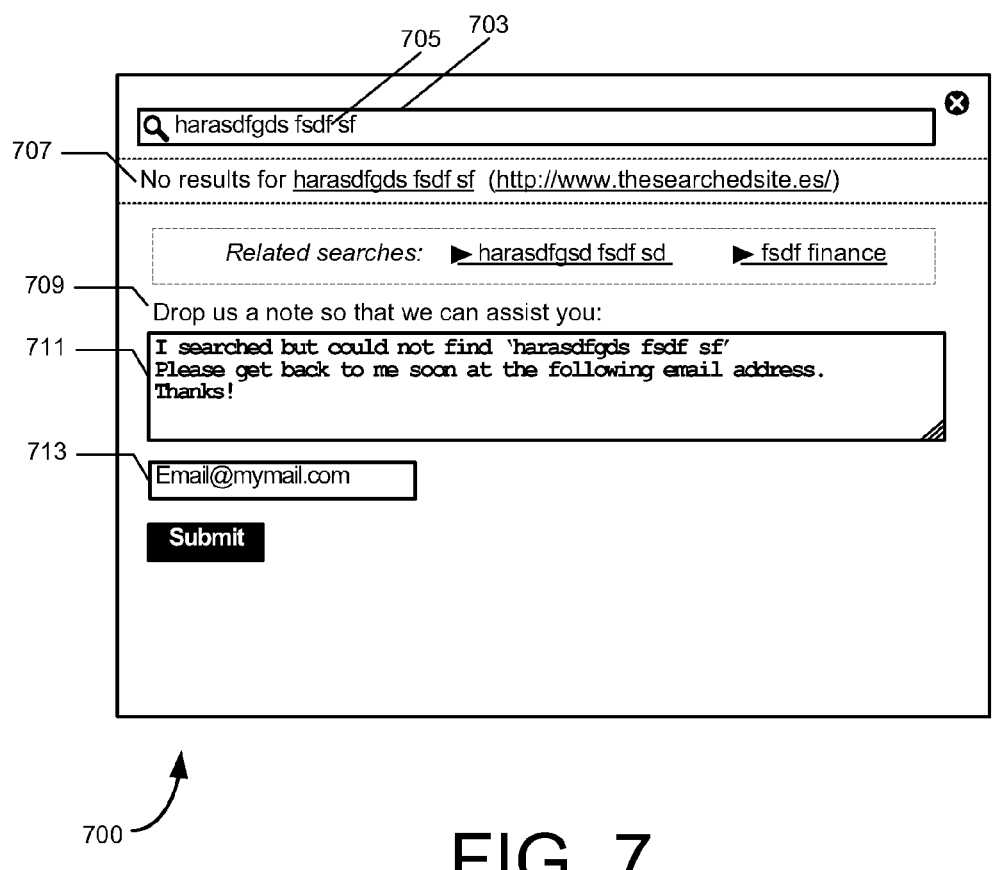
FIG. 7 shows an example window that includes a search box and that displays a message that there were no search results, and suggesting an action, according to an embodiment of the invention.

After the complete query has been received by the server-side process, there may be no answers in the index data structure 145 that match a particular query entered by the client-side user. In such a case, upon the server-side process not finding any matching entries in the index data structure, the server-side process sends code to the client-side process to cause a message to be displayed to the user, e.g., in a pop down window, or in a pop-up window. The message, for example, states that there are no results found for the particular query (on the particular website). In one embodiment, an action request message is sent, not only informing the user that there are no results found for the particular query, but further sending code to the client-side process to display a message suggesting a user action. In one version, the suggested action is to contact the provider of the service by entering a comment, and contact information. FIG. 7 shows an example message window 700 that includes a search box 703 for searching a website. The search box 703 has the query 705 entered. The code received from the server-side process as a result of not finding any answers to the query 705 causes message 707 to be displayed informing the user that no results were found. In addition, in one embodiment, a message 709 is displayed suggesting an action, in this case, to contact the service by sending a note so that the user can be assisted. Additionally a text entry box 711 is displayed for the user to add or modify a note. In one version, the server processing system automatically generates a note that includes the search term, as shown in example text entry box 711 of FIG. 7. The user of course can add to or modify the note. The message window 700 also includes one or more text entry boxes for the user to enter contact information, including one or more of email address, phone number, and so forth, and also, in some versions, an indication of how the user wishes to be contacted. In FIG. 7, only an email box is shown. When a user sends the note, e.g., by clicking on "Submit" box in the example shown.

The information is sent to the server-side process, and noted so that, e.g., the user may be contacted.

While the example described is for an action upon the event that there are no answers matching a query, the processes described herein are readily modified to allow for initiating different actions, e.g., by sending messages requesting different actions upon occurrence of certain events after at least one portion of the query is accepted, the "no answers found event" being one such event. As an example, there may be some answers that when selected, are best dealt with by contacting the user. This, one example of an event is a user selection of a particular answer that is one of a set of particular answers that require an action. These particular answers may have an additional field in their respective index entry, added, e.g., during the indexing, the field to indicate that upon a user selecting the particular action, code is sent to cause a message be displayed to the user. Upon a particular answer being selected, in one alternate embodiment, a window is displayed suggesting that the user provide contact information so that a representative, e.g., of the website owner can contact the user. One skilled in the art will no doubt see other application of the event detection and action initiation aspect of the invention.

Application of Embodiments of the Invention

Website Search

Table 1 below shows how using an embodiment of the present invention might compare with features of an implementation of an existing website search. While each provides an autocomplete function, the displayed list in an existing website search is of queries, while the displayed list in an embodiment of the present invention is of answers, i.e., of results of carrying out one or more queries. In an existing website search, selecting one of the queries causes control to pass to a search engine which serves a results page generated by the search engine. To get to a result, a user then needs to select one of the search results. In an embodiment of the present invention, a search engine is not involved, when searching in a set of websites that have been pre-processed. A user's selecting one of the answers navigates directly to the answer Web page or part of a website.

The resolution can be of a small part of a Web page, whereas in a conventional search, the resolution typically is of a complete Web page.

TABLE 1

| Process/display feature | Existing website search | An embodiment of the invention |
| --- | --- | --- |
| Users enter query | Yes | Yes |
| Autocomplete suggest list | Queries [optional] | Results |
| Navigation | To a Web page of results (the first of one or more result Web pages) | . Directly to the actual search result; a results Web page is not needed. |
| Result resolution | Whole Web page | Portion of web |
| Result screen real estate | Paragraph | Single line |

TABLE 1-continued

| Process/display feature | Existing website search | An embodiment of the invention |
| --- | --- | --- |
| Result context | No | Yes |
| Navigation to Result | Land on top of Web page | Land on relevant section |
| Reach relevant result section | Manually scroll | Automatically scrolled |
| Find relevant result section | Manually eye-scan | Automatically highlighted |

Electronic Commerce Website Search

Some e-commerce websites (such as Amazon.com) have search systems that also include suggestions while a user enters keystrokes (types). However, these e-commerce website search systems search only the website's product database, whereas embodiments of the present invention crawl and indexes all Web pages on a set of websites on the Web. Furthermore, with e-commerce sites that provide suggestions while one types, those suggestions are for queries, that when selected, navigate to a search result Web page. With Applicant's invention, the suggestions are of results. Embodiments of the present invention add the search UI to any Web page requested by a user, whereas Electronic commerce websites have search boxes pre-designed and present in some, but not other Web pages.

General

Note that the term "a character input mechanism" of a client device or processing system means any of a keyboard or keypad that is integral to the client device, and a keyboard or keypad that is coupled, by wire or wirelessly, directly, or via some network, to the client device, or a "virtual" keyboard or keypad in the form of a display of a keyboard or keypad with which a user can interact. Furthermore, by a display being included in a client device is meant any of a display that is integral to the client device, and a display that is coupled, by wire or wirelessly, directly, or via some network, to the client device.

Note that a data structure other than a table may be used for the index, and using such an alternate data structure would be straightforward to those skilled in the art from the herein-provided description.

Unless specifically stated otherwise, as apparent from the following description, it is appreciated that throughout the specification discussions utilizing terms such as "processing," "computing," "calculating," "determining" or the like, may refer to, without limitation, the action and/or processes of hardware, e.g., an electronic circuit, a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The network coupling the server processing system 131 to the client processing system 101 may be an internetwork such as the Internet, a cellular communication network, a combination of the two, or even an intranet.

Note that when a method is described that includes several elements, e.g., several steps, no ordering of such elements, e.g., of such steps is implied, unless specifically stated.

The methodologies described herein are, in some embodiments, performable by one or more processors of a server processing system 131, or, as indicated above, one or more client processors of a client processing system 101. The processor(s), in either case, accept logic, instructions encoded on one or more computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device, and a network interface device.

In one example, a server computer system carries out the pre-processing. Such a computer may be a standard computer system used for serving information to clients, e.g., clients connected via a network. The client device, in one embodiment, is a mobile device, such as a smart phone (e.g., iPhone, Android phone, or some other type of smart-phone). a tablet (e.g., iPad, Android tablet, Microsoft Surface, etc.), a mobile music player that has a screen and a real or virtual, i.e., displayed keyboard, and so forth. Such devices have small screens, so that being able to avoid needing to display a traditional results Web page provides some advantage.

In some embodiments, a non-transitory computer-readable medium is configured with, e.g., encoded with instructions, e.g., logic that when executed by one or more processors, e.g., the processor of a mobile device and the one or more processors of a server device. A processor may be a digital signal processing (DSP) device or subsystem that includes at least one processor element and a storage subsystem containing instructions that when executed, cause carrying out a method as described herein. Some embodiments are in the form of the logic itself. A non-transitory computer-readable medium is any computer-readable medium that is statutory subject matter under the patent laws applicable to this disclosure, including Section 101 of Title 35 of the United States Code. A non-transitory computer-readable medium is for example any computer-readable medium that is not specifically a transitory propagated signal or a transitory carrier wave or some other transitory transmission medium. The term "non-transitory computer-readable medium" thus covers any tangible computer-readable storage medium. In a typical processing system as described above, the storage subsystem thus includes a computer-readable storage medium that is configured with, e.g., encoded with instructions, e.g., logic, e.g., software that when executed by one or more processors, causes carrying out one or more of the method steps described herein. The software may reside in the hard disk, or may also reside, completely or at least partially, within the memory, e.g., RAM and/or within the processor registers during execution thereof by the computer system. Thus, the memory and the processor registers also constitute a non-transitory computer-readable medium on which can be encoded instructions to cause, when executed, carrying out method steps. Non-transitory computer-readable media include any tangible computer-readable storage media and may take many forms including non-volatile storage media and volatile storage media. Non-volatile storage media include, for example, static RAM, optical disks, magnetic disks, and magneto-optical disks. Volatile storage media includes dynamic memory, such as main memory in a processing system, and hardware registers in a processing system.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more processors operate as a standalone device or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a Personal Digital Assistant (PDA), a game machine, a cellular telephone, a Web appliance, a network router, switch or bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a data processing system, logic, e.g., embodied in a non-transitory computer-readable medium, or a computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, coupled to does not imply direction. Hence, the expression "a device A is coupled to a device B" may be synonymous with the expression "a device B is coupled to a device A." "Coupled" may mean that two or more elements are either in direct physical or electrical contact, or that two or more elements are not in direct contact with each other but yet still co-operate or interact with each other.

In addition, use of the "a" or "an" are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention, to the extent permitted by law. For example, to the extent permitted by law: any formulas given above are merely representative of procedures that may be used; functionality may be added or deleted from the block diagrams and operations may be interchanged among functional blocks; and steps may be added to or deleted from methods described within the scope of the present invention.

We claim:

1. A method of operating a client processing system that includes one or more client processors, a character input mechanism, and a display, the method comprising:
   (A) accepting from a user a request for a Web page of a website;
   (B) sending the request to a server processing system coupled to the client processing system,
      wherein at least one of:
         the server processing system comprises a source of websites, and
         the server processing system is coupled to a source of websites,
      wherein responsive to receiving the request, the server processing system:
         provides the requested Web page of the website or another Web page of the website,
         ascertains whether the requested Web page or website thereof is included in a pre-determined answer data structure stored in or for the server processing system, and
         upon ascertaining that the requested Web page or website thereof is included in the pre-determined answer data structure, modify the provided Web page by adding a search user interface element (search UI) for display with or in the provided Web page;
   (C) accepting the server processing system-provided Web page of the website including any search UI added by the server processing system for display with or in the provided Web page;
   (D) displaying the accepted Web page on the display, including any accepted search UI added for display with or in the provided Web page;
   (E) thereafter:
      (E1) accepting, one by one, one or more characters of a search query from a user via the character input mechanism;
      (E2) sending the accepted characters on-the-fly portion-by-portion to the server processing system as the user enters the characters, such that at any time, the sent characters from the user form an initial part of one or more queries and would eventually form all of a query for carrying out a search via the website; and
      (E3) receiving from the server processing system, in response to the sending of each portion, a list of answer entities that are possible answers to the one or more queries whose initial part matches the so-far-sent initial part,
      wherein the list of answer entities is a result of the server processing system's looking up the pre-determined data structure of pre-determined answer entitles to the one or more queries whose initial part matches with the so-far-sent initial part, and
      wherein for each pre-determined query of a plurality of pre-determined queries on a plurality of Web pages of websites, the pre-determined data structure of answer entities comprises:
         one or more pre-determined answer entities for the pre-determined query, and
         for an answer entity residing in a Web page that is in a hierarchy of Web pages, the context of each answer entity for the query, the context of the answer entity comprising a parent answer entity that includes the title of the parent Web page in the hierarchy and a link on a parent Web page; and
      (E4) displaying the list of answer entities together with the context for each answer entity that is stored with its respective context in the data structure of answer entities,
      wherein each answer entity in the list includes a selection mechanism, such that the user may select a particular answer entity from the list,
      wherein the list of answer entities may change as a result of the user entering each additional portion until the complete query is entered, and
      wherein an answer entity for a query is a Web page or portion thereof that is an answer to the query.

2. A method as recited in claim 1, wherein displaying the list of answer entities includes the client processing system displaying a drop down menu containing the list of answer entities and the selection mechanism for each answer entity, and
   wherein the client processing system is operative to accept a selection from the user, the accepting causing the client processing system to send the accepted selection to be server processing system that in response, sends the answer entity of the accepted selection to the client processing system, causing the display of the client processing system to navigate to the answer entity.

3. A method as recited in claim 1, wherein the client processing system is configured to display in the list of answers the answer entity with a title and the context for those answer entities that are stored with their respective context in the data structure of answer entities, and wherein each displayed answer entity is one or two lines long such that a plurality of answer entities may be displayed simultaneously.

4. A method as recited in claim 1, wherein the user selecting an answer entity causes navigating to the Web page containing the answer entity, and further responsive to the answer entity being a portion of the Web page, to automatically scroll down and indicate the relevant portion of the Web page containing the answer entity.

5. A method as recited in claim 1, wherein the server processing system is coupled to the client processing system by a network.

6. A method as recited in claim 1, wherein the server processing system is coupled to the client processing system by the Internet.

7. A method of operating a server processing system that includes one or more server processors, wherein at least one of:

the server processing system comprises a source of websites, and the server processing system is coupled to a source of websites, the method comprising:

(A) for each of a plurality of websites that includes one or more Web pages, for each of a set of one or more queries, crawling the Web pages in the website and extracting one or more answer entities that for the query, and for an answer entity residing in a Web page that is in a hierarchy of Web pages, a context for said answer entity, the context of the answer entity comprising a parent answer entity that includes the title of the parent Web page and a link on a parent Web page;

(B) indexing each extracted answer entity, including creating an index entry and storing the index entry in an index data structure that is searchable according to the query of the answer entity;

(C) thereafter, (C1) accepting a request for a Web page of a website from a client processing system coupled to the server processing system;

(C2) ascertaining whether the requested Web page or the website is of one of the plurality of websites that was crawled, (C3) upon ascertaining that the requested Web page or the website is of one of the plurality of websites that was crawled, modifying the Web page by adding a search user interface element ("search UI") to be displayed in or with the requested Web page;

(C4) sending the requested Web page including, any added search UI to the client processing system to be displayed;

(C5) thereafter (C5.1) accepting on the fly, portion-by-portion, characters of a search query from the client processing system as a result of a user of the client processing system entering the characters, such that at any point in time, the portions form a so-far-accepted initial part of the query and would eventually form all of the search query for carrying out a search via the requested Web page or website;

(C5.2) searching the index data structure for matches with the so-far-accepted initial part of the query to determine a list of answer entities that are possible answers to the so-far-accepted initial part of the query, and further determining the context for each answer entity that is in the list and that was extracted with the answer entity during the crawling; and (C5.3) sending the list of answer entities that are possible answers to the so-far-sent initial part of the query for display at the client processing system with a selection mechanism for each displayed answer entity, such that the client processing system can accept a selection of a particular answer entity from the list, the sending comprising sending the context for each answer entity in the list that was extracted with the answer entity during the crawling, wherein the list of answer entities may change as a result of the receiving each additional portion of one or more characters until the complete query is entered, and wherein an answer entity for a query is a Web page or portion thereof that is an answer to the query.

8. A method as recited in claim 7, wherein the search, causes a search box that can accept user input to be displayed, and further, responsive to the client receiving the list of answer entities, causes the list of answer entities to be displayed with the selection mechanisms for the answer entities of the list and the context for those answer entities for which the context is sent, the method further comprising:

accepting from the client processing system a selection of a particular answer entity; and in response to accepting the selection, sending the particular answer entity of the accepted selection to the client processing system, in order to cause the client processing system to display the particular answer entity.

9. A method as recited in claim 8, wherein the particular answer entity is a portion of a particular Web page, and wherein the sending of the answer entity of the accepted selection to the client processing system includes sending a mechanism to cause the client processing system to automatically scroll down and indicate the relevant portion of the Web page containing the particular answer entity.

10. A method as recited in claim 7, wherein the client processing system is configured to display for an answer entity in the list of answers:

a title, and the context in the case the context was sent to the client processing system, and wherein each displayed answer entity in the list is one or two lines long such that a plurality of answer entities may be displayed simultaneously.

11. A method as recited in claim 7, wherein the entries of the index data structure are ranked.

12. A method as recited in claim 7, further comprising, from time to time, updating the index data structure.

13. A method as recited in claim 12, wherein the updating comprises repeating the crawling and indexing steps.

14. A method as recited in claim 12, wherein the entries of the index data structure are ranked, and wherein the updating comprises modifying the ranking of entries.

15. A method as recited in claim 7, further comprising accumulating search patterns, and updating the index data structure upon the accumulated search patterns meeting a pre-defined criterion.

16. A method as recited in claim 7, further comprising, after accepting at least a portion of the query, upon encountering an event, initiating an action, including sending code to the client processing system to display a message.

17. A method as recited in claim 16, wherein the event is that no answers are found in the index data structure, and wherein initiating the action includes sending code to the client processing system to display a message that results for the query were not found.

18. A method as recited in claim 17, the message further includes a request to make contact and/or provide information.

19. A method as recited in claim 16, wherein the event includes, after accepting a selection from the list of answers, that the selected answer is one of a set of particular answers that require initiating a respective action.

20. A method as recited in claim 7, wherein the server processing system is coupled to the client processing system by a network.

21. A method as recited in claim 7, wherein the server processing system is coupled to the client processing system by the Internet.

22. A method as recited in claim 7, wherein the server processing system is coupled to the Internet, and wherein the Internet includes at least part of the source of websites.

23. A non-transitory computer-readable medium containing instructions that when executed by one or more processors of a server processing system that is coupled to a client processing system—and that at least one of: includes a source of websites and is coupled to a source of websites, cause carrying out a method comprising:
- (A) for each of a plurality of websites that includes one or more Web pages, for each of a set of one or more queries, crawling the Web pages in the website and extracting one or more answer entities that for the query, and for an answer entity residing in a Web page that is in a hierarchy of Web pages, a context for said answer entity, the context of the answer entity comprising a parent answer entity that includes the title of the parent Web page and a link on a parent Web page;
- (B) indexing each extracted answer entity, including creating an index entry and storing the index entry in an index data structure that is searchable according to the query of the answer entity;
- (C) thereafter,
  - (C1) accepting a request for a Web page of a website from a client processing system coupled to the server processing system;
  - (C2) ascertaining whether the requested Web page is of one of the plurality of websites that was crawled,
  - (C3) upon ascertaining that the requested Web page or the website is of one of the plurality of websites that was crawled, modifying the Web page by adding a search user interface element ("search UI") to be displayed in or with the requested Web page;
  - (C4) sending the requested Web page including, any added search UI to the client processing system to be displayed;
  - (C5) thereafter
    - (C5.1) accepting on the fly, portion-by-portion, characters of a search query from the client processing system as a result of a user of the client processing system entering the characters, such that at any point in time, the portions form a so-far-accepted initial part of the query and would eventually form all of the search query for carrying out a search via the requested Web page or website;
    - (C5.2) searching the index data structure for matches with the so-far-accepted initial part of the query to determine a list of answer entities that are possible answers to the so-far-accepted initial part of the query, and further determining the context for each answer entity that is in the list and that was extracted with the answer entity during the crawling; and
    - (C5.3) sending the list of answer entities that are possible answers to the so-far-sent initial part of the query for display at the client processing system with a selection mechanism for each displayed answer entity, such that the client processing system can accept a selection of a particular answer entity from the list, the sending comprising sending the context for each answer entity in the list that was extracted with the answer entity during the crawling, wherein the list of answer entities may change as a result of the receiving each additional portion of one or more characters until the complete query is entered, and wherein an answer entity for a query is a Web page or portion thereof that is an answer to the query.

24. A non-transitory computer-readable medium as recited in claim 23, wherein the search UI comprises code that when executed on the client processing system, causes a search box that can accept user input to be displayed, and further, responsive to the client receiving the list of answer entities, causes the list of answer entities to be displayed with the selection mechanisms for the answer entities of the list and the context for those answer entities for which the context is sent, and wherein the instructions when executed by at least one of the processors further cause the server processing system to:
- accept from the client processing system a selection of a particular answer entity; and
- in response to accepting the selection, send the particular answer entity of the accepted selection to the client processing system, in order to cause the client processing system to display the particular answer entity.

25. A non-transitory computer-readable medium as recited in claim 23, wherein the entries of the index data structure are ranked.

26. A non-transitory computer-readable medium as recited in claim 23, further comprising, from time to time, updating the index data structure.

27. An apparatus comprising:
one or more processors; and
storage containing instructions and an index data structure;
wherein the apparatus is coupled to a client processing system,
wherein at least one of:
the apparatus includes a source of websites, and
the apparatus is coupled to a source of websites,
wherein the instructions, when executed by at least one of the one or more processors, cause carrying out a method comprising:
- (A) for each of a plurality of websites that includes one or more Web pages, for each of a set of one or more queries, crawling the Web pages in the website and extracting one or more answer entities that for the query, and for an answer entity residing in a Web page that is in a hierarchy of Web pages, a context for said answer entity, the context of the answer entity comprising a parent answer entity that includes the title of the parent Web page and a link on a parent Web page;
- (B) indexing each extracted answer entity, including creating an index entry and storing the index entry in the index data structure that is searchable according to the query of the answer entity;
- (C) thereafter,
  - (C1) accepting a request for a Web page or of a website from a client processing system coupled to the server processing system;
  - (C2) ascertaining whether the requested Web page or the website is of one of the plurality of websites that was crawled,
  - (C3) upon ascertaining that the requested website or Web page is of one of the plurality of websites that was crawled, modifying the Web page by adding a search user interface element ("search UI") to be displayed in or with the requested Web page;
  - (C4) sending the requested Web page including, any added search UI to the client processing system to be displayed;
  - (C5) thereafter
    - (C5.1) accepting on the fly, portion-by-portion, characters of a search query from the client processing system as a result of a user of the client processing system entering the characters, such that at any point in time, the portions form a so-far-accepted initial part of the query and would eventually form all of the search query for carrying out a search via the requested Web page or website;

(C5.2) searching the index data structure for matches with the so-far-accepted initial part of the query to determine a list of answer entities that are possible answers to the so-far-accepted initial part of the query, and further determining the context for each answer entity that is in the list and that was extracted with the answer entity during the crawling; and (C5.3) sending the list of answer entities that are possible answers to the so-far-sent initial part of the query for display at the client processing system with a selection mechanism for each displayed answer entity, such that the client processing system can accept a selection of a particular answer entity from the list, the sending comprising sending the context for each answer entity in the list that was extracted with the answer entity during the crawling, wherein the list of answer entities may change as a result of the receiving each additional portion of one or more characters until the complete query is entered, and wherein an answer entity for a query is a Web page or portion thereof that is an answer to the query.

28. An apparatus as recited in claim 27, wherein the search UI comprises code that when executed on the client processing system, causes a search box that can accept user input to be displayed, and further, responsive to the client receiving the list of answer entities, causes the list of answer entities to be displayed with the selection mechanisms for the answer entities of the list and the context for those answer entities for which the context is sent, and wherein the instructions when executed by at least one of the one or more processors, further cause:

accepting from the client processing system a selection of a particular answer entity; and in response to accepting the selection, sending the particular answer entity of the accepted selection to the client processing system, in order to cause the client processing system to display the particular answer entity.

29. An apparatus as recited in claim 27, wherein the entries of the index data structure are ranked.

30. An apparatus as recited in claim 27, wherein the instructions when executed by at least one of the processors, further cause, from time to time, updating the index data structure.

* * * * *